G. R. THOMSON.
BUCKSAW ROD.
APPLICATION FILED APR. 9, 1915.

1,183,141.

Patented May 16, 1916.

UNITED STATES PATENT OFFICE.

GEORGE RUSSELL THOMSON, OF TORONTO, ONTARIO, CANADA.

BUCKSAW-ROD.

1,183,141.   Specification of Letters Patent.   Patented May 16, 1916.

Application filed April 9, 1915. Serial No. 20,177.

*To all whom it may concern:*

Be it known that I, GEORGE RUSSELL THOMSON, a subject of the King of Great Britain, and resident of the city of Toronto, county of York, Province of Ontario, in the Dominion of Canada, have invented certain new and useful Improvements in Bucksaw-Rods, described in the following specification and illustrated in the accompanying drawings, that form part of the same.

The principal objects of the invention are, to facilitate the tightening of the buck saw frame, providing a rod which may be very easily and quickly adjusted and which may be instantly released to relieve the tension on the blade and again tightened in a similar manner.

A further object is to obviate the loss incident to the ordinary turn buckle construction of buck-saw rods due to stripping of the threads and pulling out of rivet ends, and to devise a simple, strong and efficient buck-saw rod which may be produced at low cost.

The principal feature of the invention consists in the novel construction and arrangement of parts, whereby a pair of looped rods adapted to engage the back ends of the buck saw frame are adjustably connected together by an eccentric lever pivotally connected.

Figure 1:
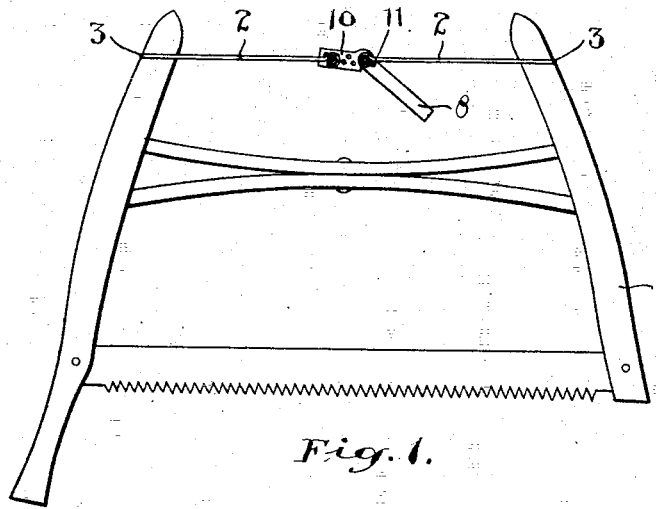
Figure 2:
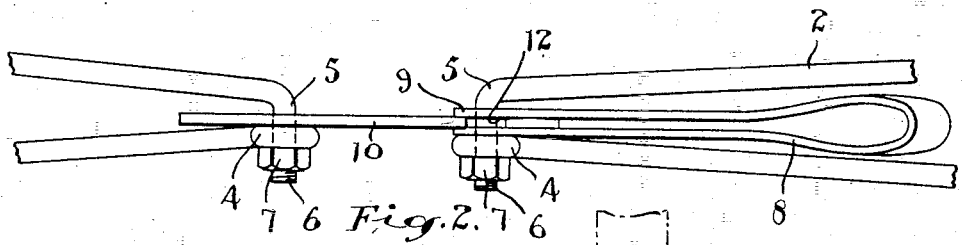
Figure 3:
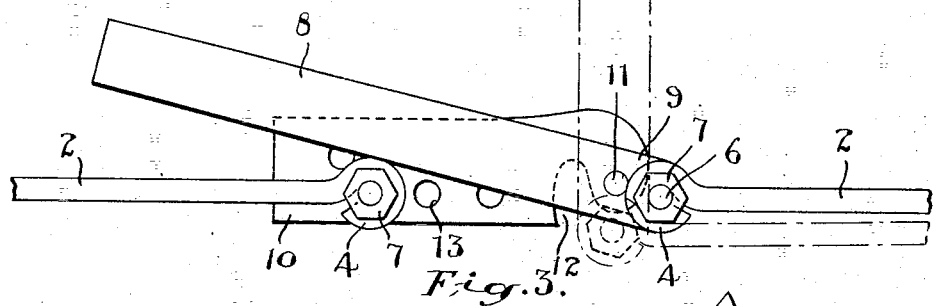
Figure 4:
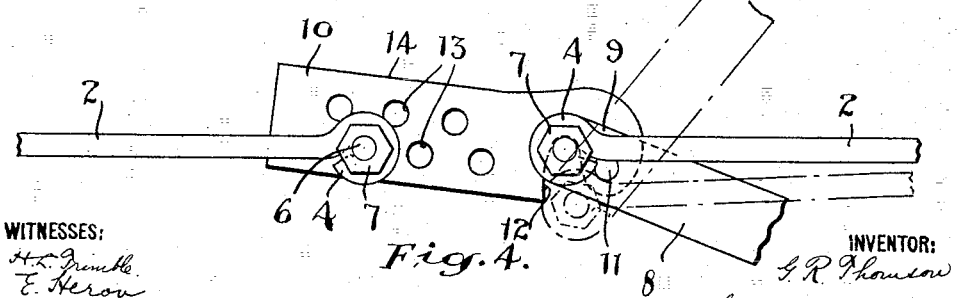

In the drawings, Figure 1 is a side elevational view showing the application of my invention thereto. Fig. 2 is an edge plan view of the meeting ends of the looped buck saw rods and the adjustable connecting members. Fig. 3 is a side elevational view of the adjustable connecting members and ends of the rods showing the lever in its unlocked position in full lines and in dotted lines shown drawn part way to the locked position. Fig. 4 is a side elevational view of the adjustable members showing the locking lever in a partly locked position in dotted lines and in its full locked position in full lines.

Like numerals of reference indicate corresponding parts in each figure.

Referring to the drawings, 1 is the buck saw frame which is of ordinary construction.

2 are rods formed in loop shape, the looped portions 3 being adapted to be placed around the ends of the buck saw frame, said rods having an eye 4 formed at one end and the other end 5 bent laterally and adapted to pass through the eye 4, the extremity 6 thereof being threaded to receive the nut 7.

8 is a lever formed of a looped length of flat metal having the ends 9 pivotally mounted upon the bolt ends 5 of one of the rods 2 and adapted to swing through the loop of the rod.

10 is a plate pivotally mounted between the legs of the lever 8 upon a rivet 11 secured a short distance from the pivot support of the lever, said plate swinging freely between the legs of the lever and having a notch 12 formed in one side adjacent to the pivot 11 adapted to receive the transverse bolt end 5 of the rod connected to the lever and to allow said transverse bolt end to swing into the plate beyond the horizontal line of the pivot 11.

13 are a plurality of holes formed in the opposite end 14 of the plate 10 preferably placed in staggered arrangement and adapted to receive the end 5 of the other rod. These holes are arranged for the adjustment of the rod to the desired length and the lever is utilized for tightening the saw blade and locking the rod in the tightened position.

In the use of this device the looped ends of the rods are slipped over the ends of the buck saw frame into the usual notches. The lever is thrown to the position shown in figure 3 and the adjustment of the rod in the holes 13 is effected by simply removing the nut and springing the bolt portion out of the eye and passing it through the desired hole in the plate and then replacing the nut. The lever 8 is then swung outwardly and rotated upon its pivot 11 and being connected to the other rod through the medium of the plate it draws upon the rod connected to the short end and when moved to its final position throws the cross end of the rod into a position out of alinement between the centers of the two bolts 5, thus locking the rods securely in the tightened position. In order to relieve the strain upon the saw it is merely necessary to push the lever up until the bolt moves past the centers.

What I claim as my invention is:—

A buck saw tensioning device, comprising, a pair of rods each doubled intermediate of their length and formed into loops adapted to extend over the frame of the saw and each having one of the terminal ends formed with an eye and the other end bent at right angles to extend through said eye and threaded to receive a nut, a plate adjustably and pivotally secured upon the right angular turned end of one of said loops and having a notch in one edge thereof adjacent to the end farthest from the pivotal connection to said rod, a lever pivotally secured intermediate of its length to said plate adjacent to the notch, the short end of said lever being pivotally connected to the right angularly turned end of the other looped rod and adapted to swing the said rod end into the notch in the plate and beyond the center line of the pivotal connection.

Signed at the city of Toronto, county of York, Ontario, Canada, this 13th day of March, 1915.

GEO. R. THOMSON.

Witnesses:
E. HERON,
A. G. KELLY.